(12) United States Patent
Uchibori et al.

(10) Patent No.: US 11,904,798 B2
(45) Date of Patent: Feb. 20, 2024

(54) WEBBING TAKE-UP DEVICE

(71) Applicant: KABUSHIKI KAISHA TOKAI-RIKA-DENKI-SEISAKUSHO, Aichi (JP)

(72) Inventors: Hayato Uchibori, Aichi-ken (JP); Yoshiteru Sakaguchi, Aichi-ken (JP); Yuta Suzuki, Aichi-ken (JP); Tomoya Yokoi, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 148 days.

(21) Appl. No.: 17/591,663

(22) Filed: Feb. 3, 2022

(65) Prior Publication Data
US 2022/0274559 A1 Sep. 1, 2022

(30) Foreign Application Priority Data
Mar. 1, 2021 (JP) .................. 2021-032090

(51) Int. Cl.
*B60R 22/46* (2006.01)
(52) U.S. Cl.
CPC ................. *B60R 22/4628* (2013.01)
(58) Field of Classification Search
CPC ............. B60R 22/46; B60R 22/4628; B60R 2022/4642
See application file for complete search history.

(56) References Cited

U.S. PATENT DOCUMENTS

| | | | |
|---|---|---|---|
| 2015/0336538 A1* | 11/2015 | Gray | B60R 22/4628 242/389 |
| 2019/0299923 A1 | 10/2019 | Yanagawa et al. | |
| 2020/0269805 A1* | 8/2020 | Hall | B60R 22/46 |
| 2020/0324733 A1 | 10/2020 | Yanagawa | |
| 2020/0353892 A1* | 11/2020 | Wang | B60R 22/46 |

FOREIGN PATENT DOCUMENTS

DE 10356180 A1 7/2004
JP 2017-218087 A 12/2017

* cited by examiner

*Primary Examiner* — Sang K Kim
(74) *Attorney, Agent, or Firm* — Thomas W. Cole; Calderon Safran & Cole P.C.

(57) ABSTRACT

A webbing take-up device including: a spool; a tube-shaped cylinder; a fluid supply unit; a rotating member including thrust teeth in a radial pattern about a rotation central axial line formed to faces that oppose one another in an axial direction, and including a tapered portion formed to a rotation outer peripheral side end portion of each of the thrust teeth and having a rotation axial direction dimension that decreases on progression toward a rotation radial direction outside, the spool being rotated in the take-up direction by the rotating member rotating toward one side; and a moving member that is moved toward the axial direction leading end side of the cylinder under pressure of the fluid to cause the rotating member to rotate toward the one side by being moved in an engaged state with the thrust teeth of the rotating member.

12 Claims, 6 Drawing Sheets

WEBBING TAKE-UP DEVICE

CROSS-REFERENCE TO RELATED APPLICATION

This application is based on and claims priority under 35 USC 119 from Japanese Patent Application No. 2021-032090 filed on Mar. 1, 2021, the disclosure of which is incorporated by reference herein.

BACKGROUND

Technical Field

The present disclosure relates to a webbing take-up device in which a spool is rotated in a take-up direction by rotating a rotating member.

Related Art

For example, as disclosed in Japanese Patent Application Laid-Open (JP-A) No. 2017-218087, a rotating body may include plural engagement teeth. The engagement teeth project toward one rotation axial direction side of a spool from a base section extending along a rotation radial direction of the spool. For each of the engagement teeth, a thickness dimension in a spool rotation circumferential direction of a portion on the opposite side to the base section is set less than a thickness dimension in the spool rotation circumferential direction of a portion on the base section side. Resistance when the moving member engages with the engagement teeth of the rotating body is reduced as a result.

SUMMARY

In consideration of the above circumstances, an object of the present disclosure is to obtain a webbing take-up device capable of further reducing resistance when engagement teeth of a rotating body stick into a moving member.

A webbing take-up device of a first aspect of the present disclosure includes: a spool configured to take up a webbing of a seatbelt device by being rotated in a take-up direction; a tube-shaped cylinder open at an axial direction leading end side; a fluid supply unit provided at an axial direction base end side of the cylinder and configured to supply a fluid inside the cylinder in a vehicle emergency; a rotating member including thrust teeth in a radial pattern about a rotation central axial line formed to faces that are rotated coaxially and oppose one another in an axial direction, and including a tapered portion formed to a rotation outer peripheral side end portion of each of the thrust teeth and having a rotation axial direction dimension that decreases on progression toward a rotation radial direction outside, the spool being rotated in the take-up direction by the rotating member rotating toward one side; and a moving member provided inside the cylinder and configured to be moved toward the axial direction leading end side of the cylinder under pressure of the fluid, and to cause the rotating member to rotate toward the one side by being moved in an engaged state with the thrust teeth of the rotating member.

In the webbing take-up device of the first aspect of the present disclosure, the fluid supply unit is provided at the axial direction base end side of the cylinder, and the fluid is supplied inside the cylinder when the fluid supply unit is actuated in a vehicle emergency. When the pressure inside the cylinder rises as a result, the moving member provided inside the cylinder is moved toward the axial direction leading end side of the cylinder, and the moving member moves out through the opening in the axial direction leading end side of the cylinder.

Having moved out through the opening in the axial direction leading end side of the cylinder, the moving member enters between the mutually opposing faces of the rotating member that rotate coaxially to one another. The thrust teeth are respectively formed to these mutually opposing faces. The thrust teeth are formed in a radial pattern about the rotation central axial line. The tapered portion with a rotation axial direction dimension that decreases on progression toward the rotation radial direction outside is formed to the rotation outer peripheral end portion of each of the thrust teeth.

Thus, the tapered portion sticks into the moving member that has entered between the mutually opposing faces of the rotating member. The moving member that the tapered portion has stuck into presses the thrust teeth in the direction of progress of the moving member. The rotating member is rotated toward the one side as a result. When the rotating member is rotated toward the one side, the spool is rotated in the take-up direction, and the webbing of the seatbelt device is taken up onto the spool as a result.

Note that since it is the tapered portion of the thrust teeth that sticks into the moving member, there is little resistance when the tapered portion of the thrust teeth sticks in. The spool is thereby effectively rotated in the take-up direction.

A webbing take-up device of a second aspect of the present disclosure is the webbing take-up device according to the first aspect, wherein the rotating member includes a pair of circular plates opposing one another coaxially in the rotation axial direction and including the thrust teeth formed to the mutually opposing faces.

In the webbing take-up device of the second aspect of the present disclosure, the rotating member includes the pair of circular plates. The pair of circular plates oppose one another coaxially in the rotation axial direction of the rotating member. The thrust teeth described above are formed to the opposing faces of the pair of circular plates. The tapered portion is formed to each of the thrust teeth. Since the tapered portion sticks into the moving member that has entered between the mutually opposing faces of the pair of circular plates of the rotating member, there is little resistance when the tapered portion of the thrust teeth sticks in. The spool is thereby effectively rotated in the take-up direction.

A webbing take-up device of a third aspect of the present disclosure is the webbing take-up device according to the first aspect or the second aspect, wherein a radial tooth is formed at a rotation center side of the faces of the rotating member formed with the thrust teeth so as to run along an axial line at the rotation center.

In the webbing take-up device of the third aspect of the present disclosure, the radial tooth is formed at the rotation center side of the faces of the rotating member formed with the thrust teeth so as to run along the rotation center axial line. Thus, not only the thrust teeth but also the radial teeth engage with the moving member, thereby enabling the moving member to be even more smoothly conveyed toward the one side.

A webbing take-up device of a fourth aspect of the present disclosure is the webbing take-up device according to the third aspect, wherein a tip of the radial tooth is curved with a smaller radius of curvature than a radial dimension of an outer peripheral profile of the moving member.

In the webbing take-up device of the fourth aspect of the present disclosure, the tip of the radial tooth is curved with a smaller radius of curvature than the radial dimension of the outer peripheral profile of the moving member, thereby enabling the radial tooth to smoothly engage with the moving member.

A webbing take-up device of a fifth aspect of the present disclosure is the webbing take-up device according to any one of the first aspect to the fourth aspect, wherein plural of the tapered portions each running along a radial direction of rotation are provided arrayed around the faces of the rotating member formed with the thrust teeth.

In the webbing take-up device of the fifth aspect of the present disclosure, the plural tapered portions that each run along a radial direction of rotation are provided arrayed around the faces of the rotating member formed with the thrust teeth. This enables even smoother engagement with the moving member.

As described above, the webbing take-up device according to the present disclosure enables resistance to be further reduced when the tapered portion sticks into the moving member.

BRIEF DESCRIPTION OF THE DRAWINGS

Exemplary embodiments of the present disclosure will be described in detail based on the following figures, wherein.

DETAILED DESCRIPTION

Explanation follows regarding exemplary embodiments of the present disclosure, with reference to FIG. 1 to FIG. 6B. Note that in each of the drawings, the arrow FR indicates a vehicle front side, the arrow OUT indicates a vehicle width direction outer side, and the arrow UP indicates a vehicle upper side of a vehicle applied with a webbing take-up device 10. Moreover, in each of the drawings, the arrow A indicates a take-up direction, this being a rotation direction of a spool 18 when the spool 18 takes up a webbing 20, and the arrow B indicates a pull-out direction, this being the opposite direction to the take-up direction. Moreover, in cases in which a subsequent exemplary embodiment has basically the same locations as those of an exemplary embodiment that has already been described, the same reference numerals are allocated thereto and detailed explanation thereof is omitted.

Configuration of First Exemplary Embodiment

Figure 1:
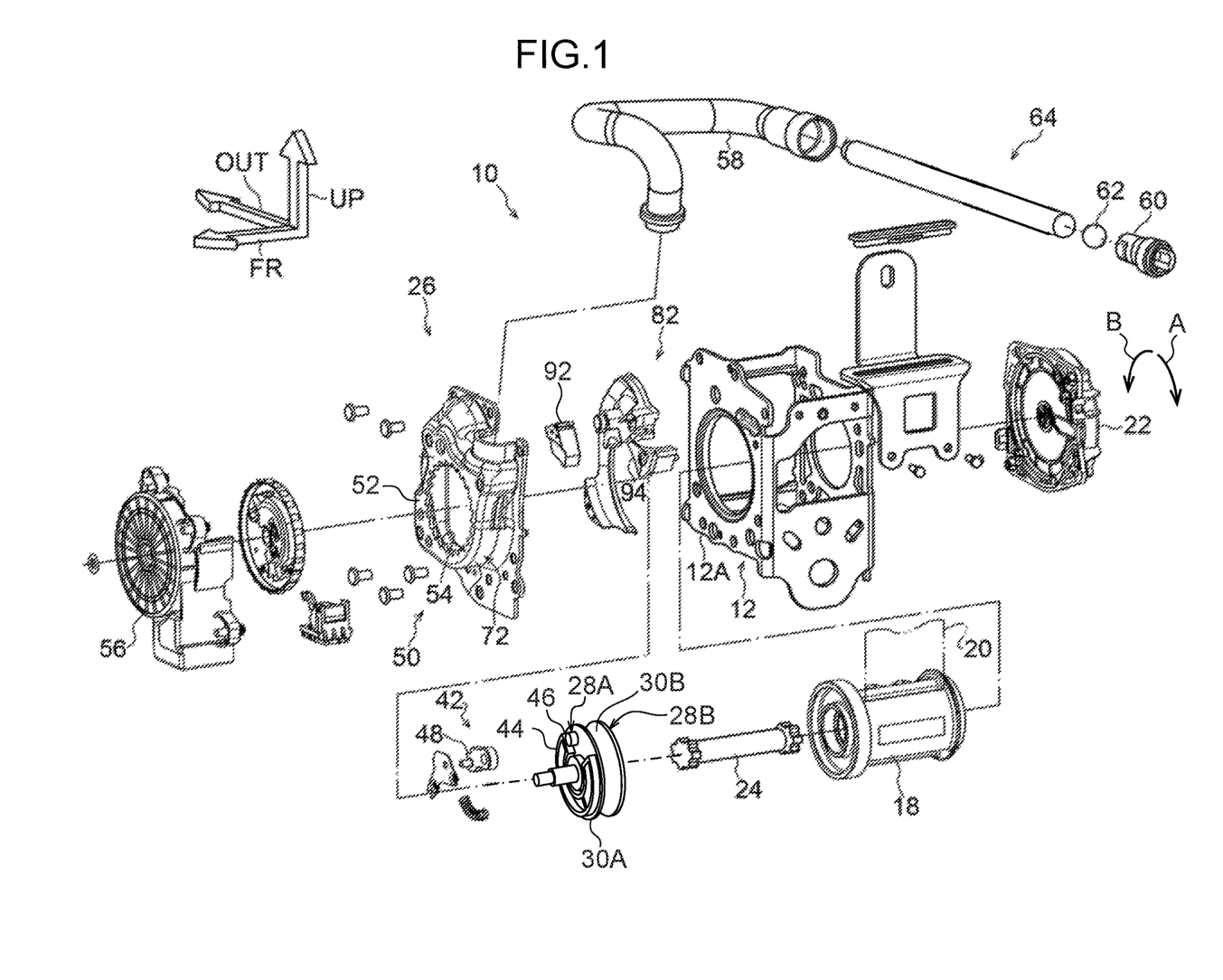
FIG. 1 is an exploded perspective view illustrating a webbing take-up device according to a first exemplary embodiment.

As illustrated in FIG. 1, the webbing take-up device 10 according to a first exemplary embodiment includes a frame 12. The frame 12 is fixed to a vehicle lower side portion of a center pillar (not illustrated in the drawings), serving as a vehicle body of the vehicle.

The spool 18 is provided to the frame 12. The spool 18 is formed in a substantially circular tube shape, and is capable of rotating about its central axial line (in the arrow A direction and arrow B direction in FIG. 1). A length direction base end portion of the elongated belt-shaped webbing 20 is anchored to the spool 18. The webbing 20 is taken up onto the spool 18 from its length direction base end side when the spool 18 is rotated in the take-up direction (the arrow A direction in FIG. 1). A length direction leading end side of the webbing 20 extends from the spool 18 toward the vehicle upper side, passes through a slit formed in a through anchor (not illustrated in the drawings) supported by the center pillar at the vehicle upper side of the frame 12, and folds back on itself toward the vehicle lower side.

A length direction leading end portion of the webbing 20 is anchored to an anchor plate (not illustrated in the drawings). The anchor plate is formed of a sheet metal material such as steel, and is fixed to a floor section (not illustrated in the drawings) of the vehicle, or to a framework member or the like of a seat (not illustrated in the drawings) corresponding to the webbing take-up device 10.

A vehicle seatbelt device applied with the webbing take-up device 10 includes a buckle device (not illustrated in the drawings). The buckle device is provided on the vehicle width direction inner side of the seat (not illustrated in the drawings) applied with the webbing take-up device 10. In a state in which the webbing 20 has been wrapped across the body of an occupant seated in the seat, a tongue (not illustrated in the drawings) provided to the webbing 20 is engaged with the buckle device, such that the webbing 20 is worn over the body of the occupant.

As illustrated in FIG. 1, a spring housing 22 is provided at the vehicle rear side of the frame 12. A spool biasing member such as a spiral spring (not illustrated in the drawings) is provided inside the spring housing 22. The spool biasing member either directly or indirectly engages with the spool 18, such that the spool 18 is biased in the take-up direction (the arrow A direction in FIG. 1) by the biasing force of the spool biasing member.

The webbing take-up device 10 also includes a torsion bar 24 configuring a force limiter mechanism. A vehicle rear side portion of the torsion bar 24 is disposed inside the spool 18 and is linked to the spool 18 in a state in which rotation of the torsion bar 24 relative to the spool 18 is limited. A vehicle front side portion of the torsion bar 24 passes through a hole formed in the frame 12 and extends toward the outside (vehicle front side) of the frame 12.

Figure 2:
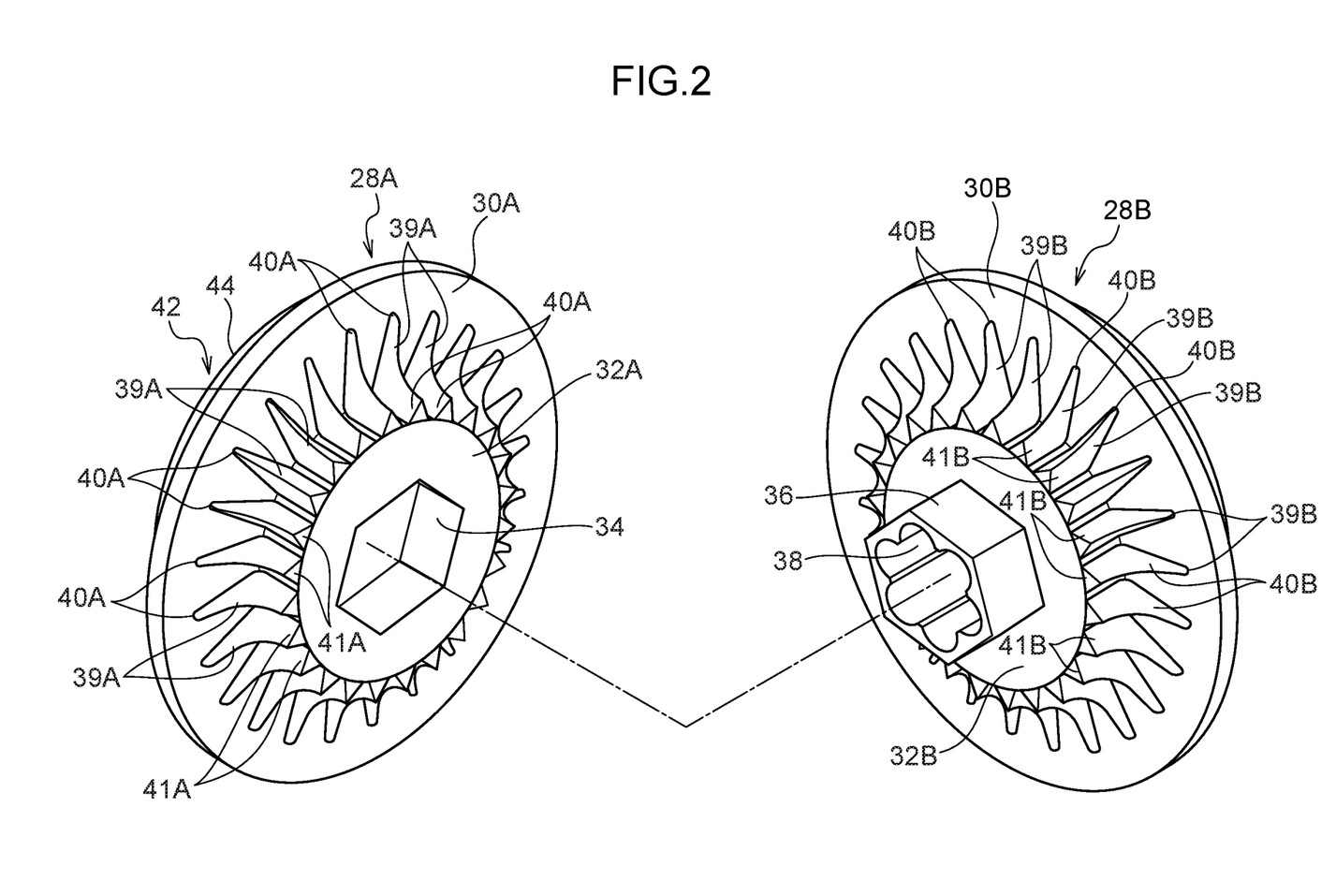
FIG. 2 is an exploded perspective view illustrating a rotating member of a webbing take-up device according to the first exemplary embodiment.

A rotating member 28A and a rotating member 28B of a pre-tensioner 26 are provided at the vehicle front side of the frame 12. As illustrated in FIG. 2, the rotating member 28A includes a circular dish 30A, and the rotating member 28B includes a circular dish 30B. The circular dish 30A of the rotating member 28A is provided at the vehicle front side of the circular dish 30B of the rotating member 28B. These circular plates 30A, 30B each have a circular plate shape, and are disposed coaxially to one another with their axial directions along the vehicle front-rear direction. A spacing between a circular dish 30B-side face of the circular dish 30A and a circular dish 30A-side face of the circular dish 30B is either the same as a diameter dimension of a moving member 64, described later, or slightly larger than the diameter dimension of the moving member 64.

A circular column-shaped shaft portion 32A is formed at substantially the center of the circular dish 30B-side face of the circular dish 30A. A first coupling hole 34 with a non-circular shape (a substantially hexagonal shape, this being an example of a non-circular shape, in FIG. 2) is formed in the shaft portion 32A so as to run along a central axial line of the shaft portion 32A. A circular column-shaped shaft portion 32B with an outer diameter dimension that is substantially the same as an outer diameter dimension of the shaft portion 32A is formed at substantially the center of the circular dish 30A-side face of the circular dish 30B. A first coupling portion 36 that can be fitted into the first coupling hole 34 in the rotating member 28A is formed to the shaft portion 32B so as to run along a central axial line of the shaft portion 32B. When the first coupling portion 36 of the shaft portion 32B is fitted into the first coupling hole 34 in the shaft portion 32A, the rotating member 28A and the rotating member 28B are limited from rotating relatively to one another.

A non-circular shaped second coupling hole 38 is formed in the shaft portion 32B so as to run along the central axial line of the shaft portion 32B. The second coupling hole 38 penetrates through the circular dish 30B and the shaft portion 32B. The vehicle front side portion of the torsion bar 24 is fitted into the second coupling hole 38, such that the rotating member 28B and the vehicle front side portion of the torsion bar 24 are limited from rotating relatively to one another.

Plural thrust teeth 39A are formed to the circular dish 30B-side face of the circular dish 30A of the rotating member 28A. Each of the thrust teeth 39A has its length direction along a radial direction of the circular dish 30A so as to collectively form a radial pattern centered on the shaft portion 32A of the circular dish 30A. An end portion of each of the thrust teeth 39A at the radial direction outside of the circular dish 30A configures a tapered portion 40A. A dimension of the tapered portion 40A about a circumferential direction of the circular dish 30A decreases on progression toward the radial direction outside of the circular dish 30A, and a dimension of the tapered portion 40A along an axial direction of the circular dish 30A also decreases on progression toward the radial direction outside of the circular dish 30A.

Radial teeth 41A are formed to an outer peripheral face of the shaft portion 32A of the rotating member 28A such that the number of radial teeth 41A is the same as the number of thrust teeth 39A. Each of the radial teeth 41A has its length direction along the axial direction of the circular dish 30A, and circular dish 30A-side end portions of the radial teeth 41A are connected to end portions of the thrust teeth 39A on the central side of the circular dish 30A. Furthermore, tips of the thrust teeth 39A (circular dish 30B-side edges of the thrust teeth 39A) at portions further toward the radial direction inside of the circular dish 30A than length direction intermediate portions of the thrust teeth 39A and edges of the radial teeth 41A at the radial direction outside of the circular dish 30A are curved with a smaller curvature than an outer peripheral portion of the moving member 64, described later.

On the other hand, thrust teeth 39B and radial teeth 41B are formed to the circular dish 30B and the shaft portion 32B of the rotating member 28B, such that the number of thrust teeth 39B is the same as the number of thrust teeth 39A. The thrust teeth 39B and the radial teeth 41B have a symmetrical structure to the thrust teeth 39A and the radial teeth 41A about a central plane between the circular dish 30B-side face of the circular dish 30A and the circular dish 30A-side face of the circular dish 30B. A tapered portion 40B is formed to an end portion of each of the thrust teeth 39B at the radial direction outside of the circular dish 30B.

The tapered portions 40B have a symmetrical structure to the tapered portions 40A about a central plane between the circular dish 30B-side face of the circular dish 30A and the circular dish 30A-side face of the circular dish 30B. When the first coupling portion 36 of the shaft portion 32B is fitted into the first coupling hole 34 in the shaft portion 32A, end portions of the radial teeth 41A on the opposite side to the thrust teeth 39A and end portions of the radial teeth 41B on the opposite side to the thrust teeth 39B oppose one another along the axial directions of the circular plates 30A, 30B.

As illustrated in FIG. 1 and FIG. 2, a lock base 44 of a locking mechanism 42 is provided to the circular dish 30A of the rotating member 28A. The lock base 44 includes a lock pawl 48. The lock pawl 48 is supported by a boss 46 formed to the lock base 44, and is capable of swinging centered on the boss 46.

As illustrated in FIG. 1, a cover plate 50 that configures both the locking mechanism 42 and the pre-tensioner 26 is fixed to a leg panel 12A on the vehicle front side of the frame 12. The cover plate 50 is open toward the vehicle rear side, and a bottom panel 52 of the cover plate 50 opposes the frame 12 in a state spaced apart from the vehicle front side of the frame 12. A ratchet hole 54 is formed in the bottom panel 52. Ratchet teeth are formed to an inner peripheral portion of the ratchet hole 54. When the lock pawl 48 of the lock base 44 is swung in one direction about the boss 46, a leading end portion of the lock pawl 48 meshes with the ratchet teeth in the ratchet hole 54. Rotation of the lock base 44 in the pull-out direction (the arrow B direction in FIG. 1) is thereby limited, such that rotation of the spool 18 in the pull-out direction is indirectly limited.

A sensor holder 56 of the locking mechanism 42 is provided at the vehicle front side of the cover plate 50. The sensor holder 56 is open toward the vehicle rear side, and is either directly fixed to the frame 12, or indirectly fixed thereto through the cover plate 50. Respective components configuring a sensor mechanism to detect an emergency state of the vehicle are housed inside the sensor holder 56. When the sensor mechanism inside the sensor holder 56 is actuated in a vehicle emergency, the lock pawl 48 of the lock base 44 is swung in the one direction about the boss 46 coordinated with rotation of the lock base 44 of the locking mechanism 42 in the pull-out direction.

The webbing take-up device 10 includes a cylinder 58 serving as a tube-shaped member configuring the pre-tensioner 26. The cylinder 58 has a circular tube shape, and is bent as required at an axial direction intermediate portion thereof. A micro gas generator 60 (hereafter referred to as the "MGG 60") serving as a fluid supply unit is inserted into an axial direction base end side of the cylinder 58. The MGG 60 is electrically connected to a collision detection sensor provided to the vehicle via an ECU serving as a control unit (none of which are illustrated in the drawings). The MGG 60 is actuated by the ECU when the collision detection sensor has detected an impact during a vehicle collision, such that gas serving as an example of a fluid generated in the MGG 60 is supplied inside the cylinder 58.

A ball seal 62 serving as a piston is disposed inside the axial direction base end side of the cylinder 58 of the pre-tensioner 26. The ball seal 62 is formed of a synthetic resin material, and the ball seal 62 has a substantially spherical shape in a state in which load is not being applied to the ball seal 62. The sealing ball 62 partitions the space inside the cylinder 58 into a space further toward the axial direction base end side than the ball seal 62 and a space further toward an axial direction leading end side than the ball seal 62. When the MGG 60 is actuated, gas generated by the MGG 60 is supplied into the cylinder 58 between the MGG 60 and the ball seal 62. When the internal pressure of the cylinder 58 between the MGG 60 and the ball seal 62 rises as a result, the ball seal 62 is moved toward the axial direction leading end side of the cylinder 58 and is compressed and deformed in the axial direction of the cylinder 58.

The moving member 64 is disposed inside the cylinder 58 of the pre-tensioner 26 such that a length direction base end portion of the moving member 64 is disposed inside the cylinder 58. The moving member 64 is formed of a synthetic resin material, and is capable of deforming when subjected to an external force. The moving member 64 is disposed further toward the axial direction leading end side of the cylinder 58 than the ball seal 62. Thus, when the ball seal 62 is moved toward the axial direction leading end side of the cylinder 58, the moving member 64 is pressed by the ball seal 62 and is moved toward the axial direction leading end side of the cylinder 58.

Figure 3:
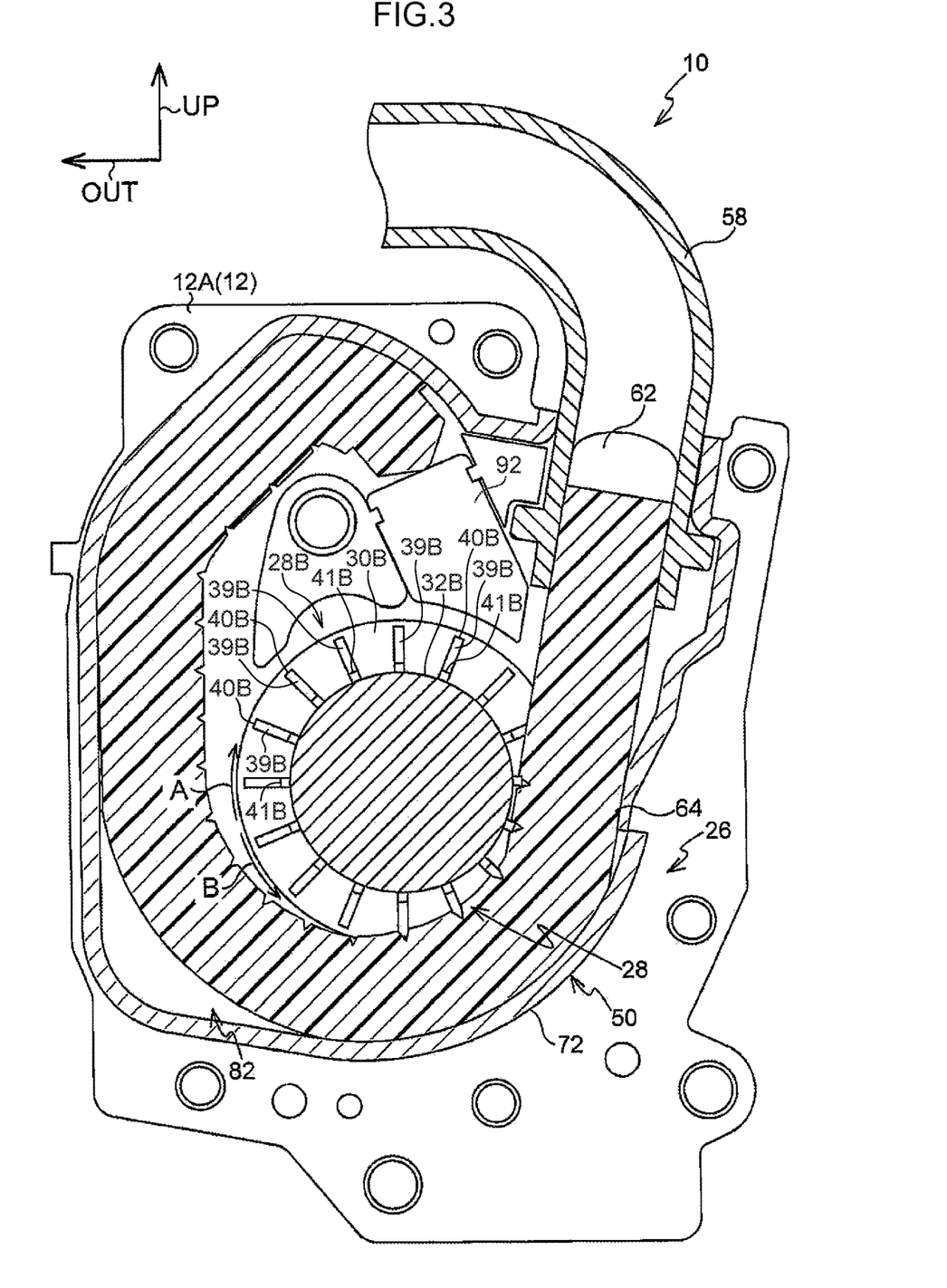
FIG. 3 is a side view of an inner side of a cover plate as viewed from a vehicle front side, illustrating a state in which a moving member has abutted a stopper.

When the moving member 64 is further pressed and moved by the ball seal 62 in a state in which the moving member 64 has reached the axial direction leading end of the cylinder 58, as illustrated in FIG. 3, the moving member 64 moves out of the axial direction leading end of the cylinder 58 toward the vehicle lower side, and enters inside the cover plate 50. When the moving member 64 is moved further toward the vehicle lower side in this state, as illustrated in FIG. 3, a length direction leading end portion of the moving member 64 abuts the thrust teeth 39A, 39B and the radial teeth 41A, 41B of the rotating members 28A, 28B. The thrust teeth 39A, 39B and the radial teeth 41A, 41B are pressed toward the vehicle lower side by the moving member 64 in this state, such that rotation force in the take-up direction is applied to the rotating members 28A, 28B from the moving member 64. The rotating members 28A, 28B are thereby rotated in the take-up direction, and the moving member 64 is moved further toward the vehicle lower side by the pressure from the ball seal 62.

Due to the moving member 64 being moved toward the vehicle lower side and the rotating members 28A, 28B being rotated in the take-up direction in this manner, the thrust teeth 39A, 39B and the radial teeth 41A, 41B of the rotating members 28A, 28B engage with the moving member 64. When the moving member 64 is moved further toward the vehicle lower side in this state, rotation force in the take-up direction is further applied the rotating members 28A, 28B, such that the rotating members 28A, 28B are further rotated in the take-up direction.

As illustrated in FIG. 1 and FIG. 2, the cover plate 50 includes the bottom panel 52. The bottom panel 52 is plate shaped, and the thickness direction of the bottom panel 52 broadly corresponds to the vehicle front-rear direction (the arrow FR direction and the opposite direction thereto in FIG. 1). The cover plate 50 also includes a side wall 72. The side wall 72 is provided around an outer peripheral portion of the bottom panel 52 of the cover plate 50. As illustrated in FIG. 2 and FIG. 3, the rotating members 28A, 28B are disposed at an inner side of the side wall 72. As illustrated in FIG. 3, a guide member 82 is provided at an inner side of the cover plate 50. Having dropped further toward the vehicle lower side than the rotating members 28A, 28B, the moving member 64 is guided by the side wall 72 of the cover plate 50 and the guide member 82 so as to rise upward at the vehicle width direction outer side of the rotating members 28A, 28B.

A stopper 92 is disposed at the vehicle upper side of the rotating members 28A, 28B. Having risen upward at the vehicle width direction outer side of the rotating members 28A, 28B, the moving member 64 presses against the stopper 92 from the vehicle upper side and vehicle width direction outer side of the stopper 92. On being pressed by the moving member 64, the stopper 92 is moved toward the vehicle lower side and the vehicle width direction inner side, and engages with the length direction base end side of the moving member 64. Progress of the moving member 64 is halted in this manner.

Operation and Advantageous Effects of First Exemplary Embodiment

Next, explanation follows regarding operation and advantageous effects of the present exemplary embodiment.

In the webbing take-up device 10, high pressure gas is supplied inside the cylinder 58 from the MGG 60 the instant the MGG 60 of the pre-tensioner 26 is actuated by the ECU in a vehicle collision, this being an example of a vehicle emergency. When the ball seal 62 is moved toward the axial direction leading end side of the cylinder 58 by the pressure of the gas, the moving member 64 is pressed by the ball seal 62, such that the moving member 64 is moved toward the axial direction leading end side of the cylinder 58.

Due to the moving member 64 being moved toward the axial direction leading end side, the moving member 64 moves out of the axial direction leading end of the cylinder 58 toward the vehicle lower side. Having moved out of the axial direction leading end of the cylinder 58 toward the vehicle lower side, the moving member 64 heads for between the circular dish 30A of the rotating member 28A and the circular dish 30B of the rotating member 28B. Having entered between the circular dish 30A of the rotating member 28A and the circular dish 30B of the rotating member 28B, the tapered portions 40A, 40B formed to portions of the thrust teeth 39A, 39B at the radial direction outsides of the circular plates 30A, 30B of the rotating members 28A, 28B stick into the moving member 64.

Next, the moving member 64 engages with the thrust teeth 39A, 39B and the radial teeth 41A, 41B of the rotating members 28A, 28B while pressing the thrust teeth 39A, 39B of the rotating members 28A, 28B toward the vehicle lower side. Due to the thrust teeth 39A, 39B and the radial teeth 41A, 41B of the rotating members 28A, 28B being pressed toward the vehicle lower side by the moving member 64 in this manner, rotation force in the take-up direction (the arrow A direction in FIG. 3) is applied to the rotating members 28A, 28B from the moving member 64. The rotating members 28A, 28B are rotated in the take-up direction as a result.

Out of the plural thrust teeth 39A, 39B and radial teeth 41A, 41B of the rotating members 28A, 28B, the thrust teeth 39A, 39B and radial teeth 41A, 41B that are further toward the pull-out direction side (the arrow B direction side in FIG. 3) than the thrust teeth 39A, 39B and radial teeth 41A, 41B pressed by the moving member 64 engage with the moving member 64 over a range from an outer peripheral face toward a radial direction center side of the moving member 64 accompanying rotation of the rotating members 28A, 28B in the take-up direction.

Due to the moving member 64 that has engaged with the thrust teeth 39A, 39B and the radial teeth 41A, 41B being moved toward the vehicle lower side in this manner, rotation force in the take-up direction is further applied to the rotating members 28A, 28B, such that the rotating members 28A, 28B are further rotated in the take-up direction. This rotation of the rotating members 28A, 28B in the take-up direction is transmitted to the spool 18 through the torsion bar 24, such that the spool 18 is rotated in the take-up direction. The webbing 20 is thus taken up onto the spool 18, increasing the restraining force on the occupant from the webbing 20.

When the moving member 64 is moved further toward the vehicle lower side than the rotating members 28A, 28B due to the moving member 64 being pressed by the sealing ball 62, the moving member 64 is guided by the side wall 72 of the cover plate 50 and the guide member 82 so as to be moved toward the vehicle upper side. When the moving member 64 is further pressed by the sealing ball 62 in this state, the axial direction leading end of the moving member 64 reaches a position at the vehicle upper side and vehicle width direction outer side of the stopper 92. When the moving member 64 is further pressed by the sealing ball 62 in this state, the moving member 64 presses the stopper 92 from the vehicle upper side and vehicle width direction outer side.

The stopper 92 is moved toward the vehicle lower side and vehicle width direction inner side as a result, so as to engage with a portion of the moving member 64 further toward the axial direction base end side than a portion of the moving member 64 that has engaged with the rotating members 28A, 28B. The moving member 64 can be prevented from coming completely out of the cylinder 58 as a result, such that the sealing ball 62 can be prevented from coming out of the cylinder 58.

Note that the tapered portion 40A is formed to the end portion of each of the thrust teeth 39A at the radial direction outside of the circular dish 30A. The dimension of the tapered portion 40A about the circumferential direction of the circular dish 30A decreases on progression toward the radial direction outside of the circular dish 30A, and the dimension of the tapered portion 40A along the axial direction of the circular dish 30A also decreases on progression toward the radial direction outside of the circular dish 30A.

The tapered portion 40B is similarly formed to the end portion of each of the thrust teeth 39B at the radial direction outside of the circular dish 30B. The dimension of the tapered portion 40B about the circumferential direction of the circular dish 30B decreases on progression toward the radial direction outside of the circular dish 30B, and the dimension of the tapered portion 40B along the axial direction of the circular dish 30B also decreases on progression toward the radial direction outside of the circular dish 30B.

Thus, the tapered portions 40A, 40B readily stick into the moving member 64 when the moving member 64 has entered between the circular dish 30A and the circular dish 30B. The moving member 64 that the tapered portions 40A, 40B have stuck into can be suppressed from sliding with respect to the thrust teeth 39A, 39B and the radial teeth 41A, 41B. The moving member 64 can thereby cause the rotating members 28A, 28B to rotate in an efficient manner.

Moreover, the tips of the thrust teeth 39A (circular dish 30B-side edges of the thrust teeth 39A) at portions further toward the radial direction inside of the circular dish 30A than the length direction intermediate portions of the thrust teeth 39A and edges of the radial teeth 41A at the radial direction outside of the circular dish 30A are curved with a smaller curvature than the outer peripheral portion of the moving member 64. Similarly, the tips of the thrust teeth 39B (circular dish 30A-side edges of the thrust teeth 39B) at portions further toward the radial direction inside of the circular dish 30B than the length direction intermediate portions of the thrust teeth 39B and edges of the radial teeth 41B at the radial direction outside of the circular dish 30B are curved with a smaller curvature than the outer peripheral portion of the moving member 64.

Thus, portions of the thrust teeth 39A, 39B and radial teeth 41A, 41B on the center sides of the rotating members 28A, 28B engage with the outer peripheral portion of the moving member 64. Since the thrust teeth 39A, 39B and the radial teeth 41A, 41B have low heights, the mechanical strength of the thrust teeth 39A, 39B and the radial teeth 41A, 41B, such as their tooth bending strength and their shear strength, is increased.

Furthermore, the positions of the thrust teeth 39A and radial teeth 41A and the positions of the thrust teeth 39B and radial teeth 41B are aligned. This enables misalignment of the axes of the circular dish 30A and the circular dish 30B when the moving member 64 contacts the thrust teeth 39A, 39B and the radial teeth 41A, 41B to be suppressed.

Moreover, since the heights of the thrust teeth 39A, 39B and the radial teeth 41A, 41B can be made lower, the pitch of the thrust teeth 39A, 39B and of the radial teeth 41A, 41B can be made narrower. This enables the number of teeth out of the thrust teeth 39A, 39B and the radial teeth 41A, 41B that engage with the moving member 64 to be increased.

Furthermore, since the heights of the thrust teeth 39A, 39B and the radial teeth 41A, 41B can be made lower, resistance due to the teeth biting in can be reduced, thereby enabling the efficiency of the pre-tensioner 26 to be increased.

Second Exemplary Embodiment

Figure 4:
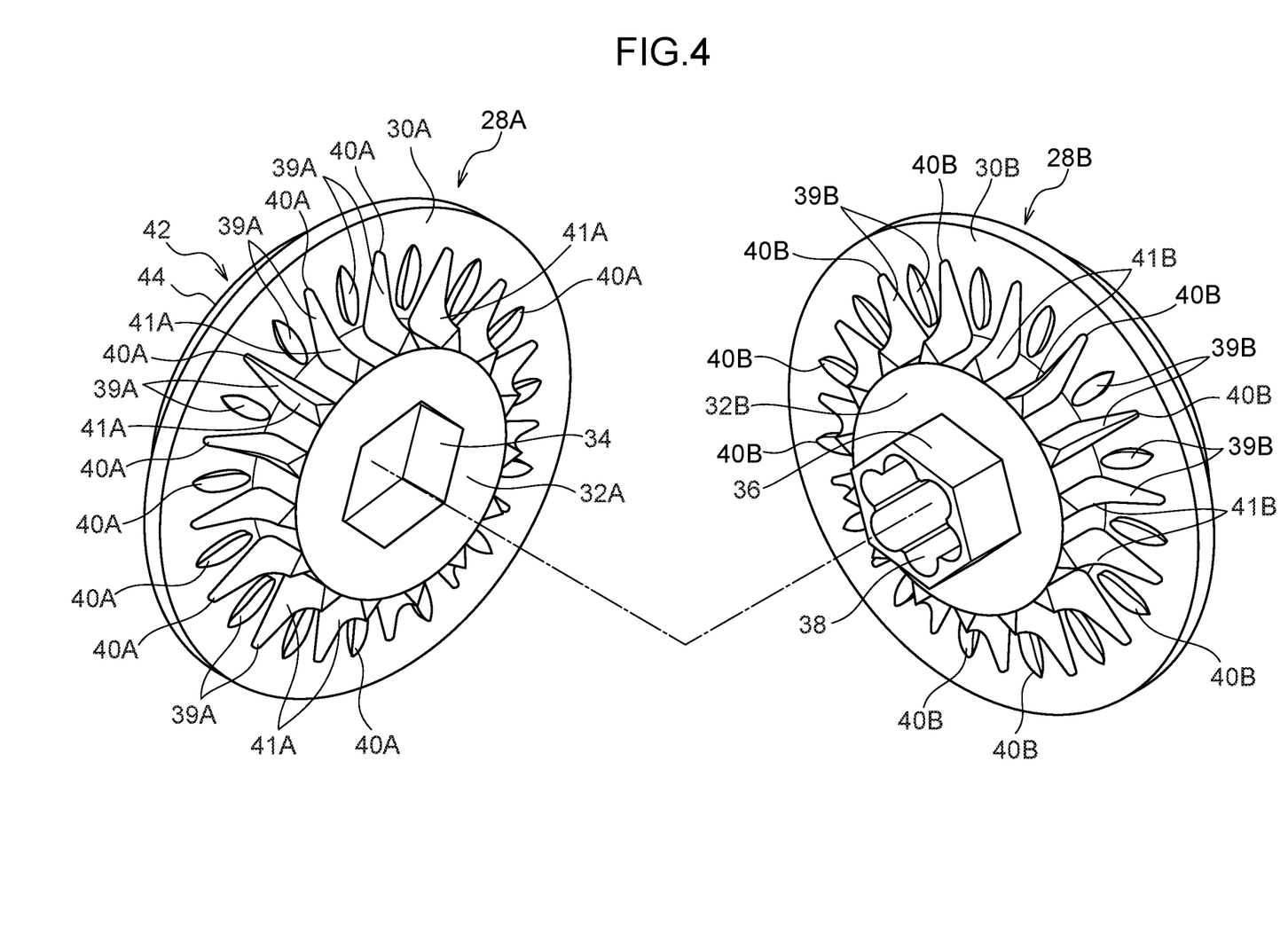
FIG. 4 is a cross-section corresponding to FIG. 2, illustrating a second exemplary embodiment.

As illustrated in FIG. 4, in a second exemplary embodiment, thrust teeth 39A, 39B are provided between the thrust teeth 39A, 39B including the radial teeth 41A, 41B that are adjacent to one another around the circumferential directions of the rotating members 28A, 28B. The thrust teeth 39A, 39B that are provided between the thrust teeth 39A, 39B including the radial teeth 41A, 41B do not include any radial teeth 41A, 41B. Namely, in the present exemplary embodiment, the thrust teeth 39A, 39B including the radial teeth 41A, 41B, and the thrust teeth 39A, 39B without radial teeth 41A, 41B, are provided alternately around the circumferential directions of the rotating members 28A, 28B. Moreover, end portions of the thrust teeth 39A, 39B without radial teeth 41A, 41B that are on the shaft portion 32A, 32B sides of the rotating members 28A, 28B do not extend as far as the shaft portions 32A, 32B.

The thrust teeth 39A, 39B including the radial teeth 41A, 41B and the thrust teeth 39A, 39B without radial teeth 41A, 41B are formed alternately around the circumferential directions of the rotating members 28A, 28B with a predetermined angle therebetween. Note that the spacing between the thrust teeth 39A, 39B including the radial teeth 41A, 41B that are adjacent around the circumferential directions of the rotating members 28A, 28B is greater at the radial direction outsides of the rotating members 28A, 28B than at the radial direction center sides of the rotating members 28A, 28B. The thrust teeth 39A, 39B without radial teeth 41A, 41B are thereby disposed between the thrust teeth 39A, 39B including the radial teeth 41A, 41B that are adjacent to one another around the circumferential directions of the rotating members 28A, 28B. This enables the pitch of the thrust teeth 39A, 39B to be made narrower, thereby enabling the number of thrust teeth 39A, 39B that engage with the moving member 64 to be increased.

The present exemplary embodiment enables similar advantageous effects to those in the first exemplary embodiment to be obtained.

Third Exemplary Embodiment

Figure 5:
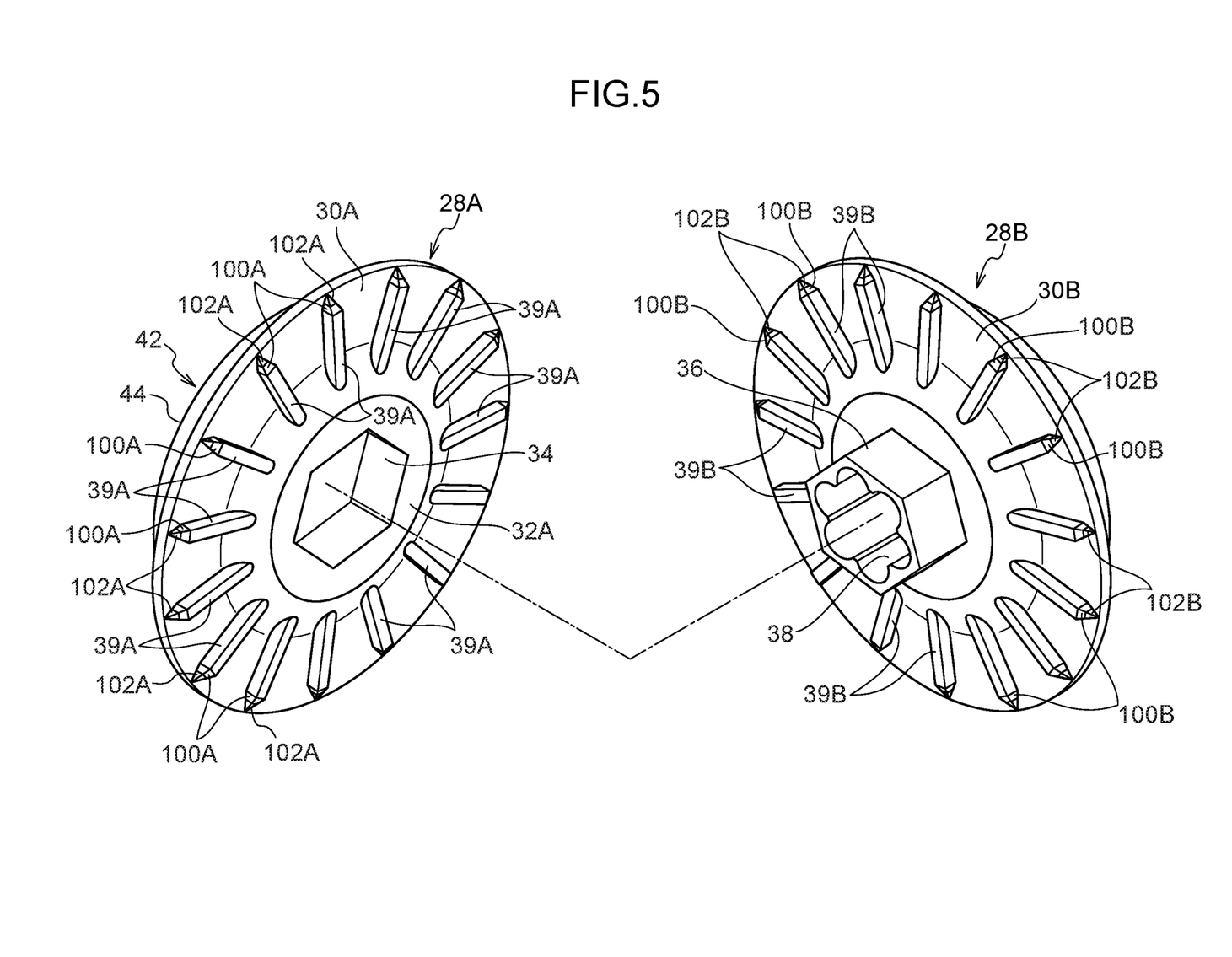
FIG. 5 is a cross-section corresponding to FIG. 2, illustrating a third exemplary embodiment.
Figure 6A:
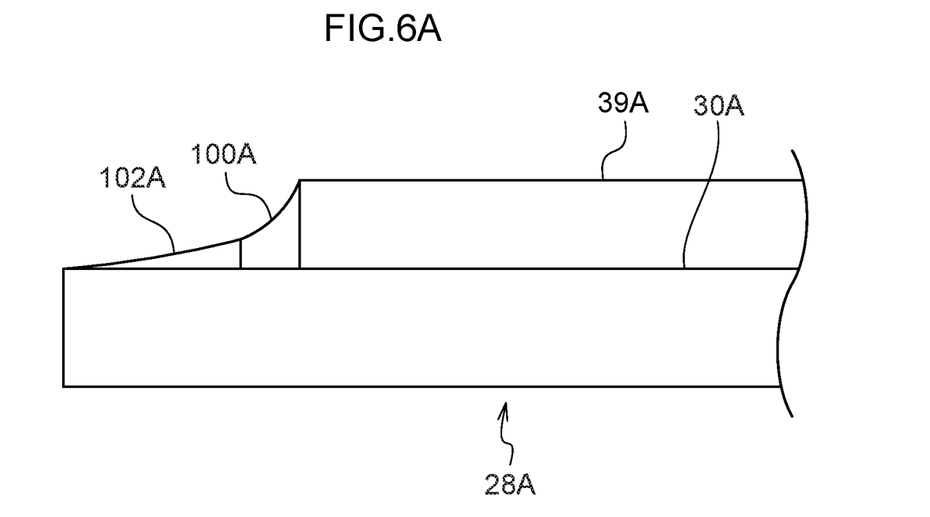
FIG. 6A is an enlarged cross-section sectioned along a direction orthogonal to a central axial line of a circular dish.
Figure 6B:
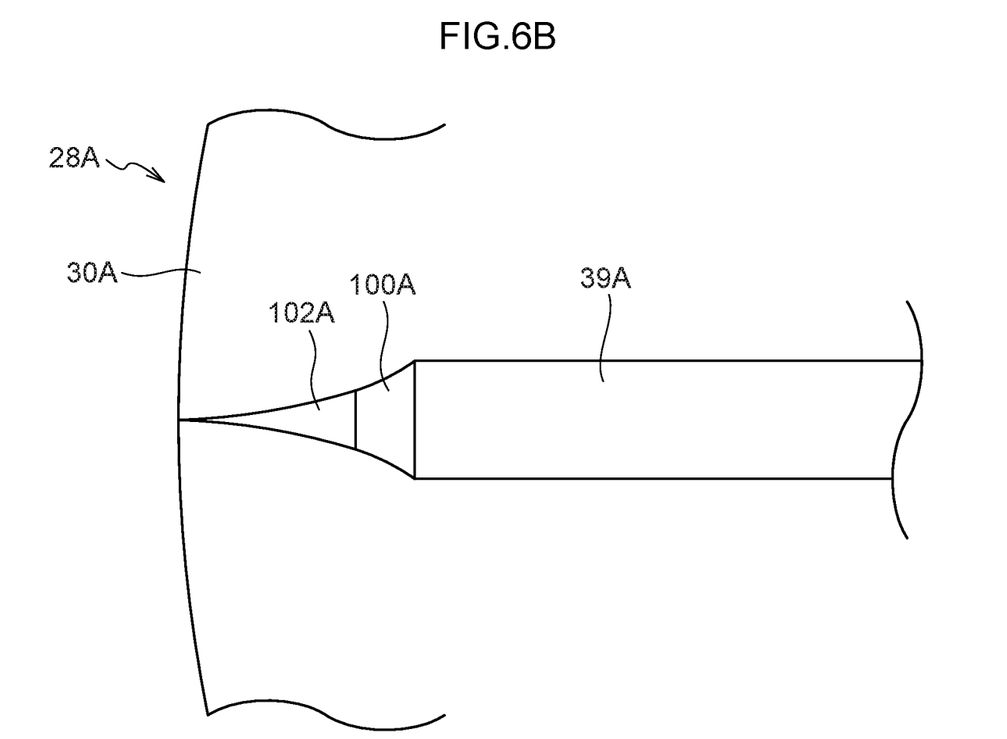
FIG. 6B is an enlarged view of a circular dish as viewed along a central axial line direction.

As illustrated in FIG. 5, FIG. 6A, and FIG. 6B, in a third exemplary embodiment, the thrust teeth 39A, 39B do not include any radial teeth 41A, 41B. Moreover, instead of tapered portions 40A, 40B, first tapered portions 100A, 100B and second tapered portions 102A, 102B are respectively formed to end portions of the respective thrust teeth 39A, 39B at the radial direction outsides of the rotating members 28A, 28B.

The first tapered portions 100A, 100B are formed continuously to ends of the respective thrust teeth 39A, 39B at the radial direction outsides of the circular plates 30A, 30B. The second tapered portions 102A, 102B are formed on the opposite sides of the respective thrust teeth 39A, 39B to the first tapered portions 100A, 100B.

The first tapered portions 100A, 100B have sloped peripheral faces such that their dimensions about the circumferential directions of the circular plates 30A, 30B and their dimensions along the axial directions of the circular plates 30A, 30B decrease on progression toward the opposite sides to the respective thrust teeth 39A, 39B. Similarly, the second tapered portions 102A, 102B have sloped peripheral faces such that their dimensions about the circumferential directions of the circular plates 30A, 30B and their dimensions along the axial directions of the circular plates 30A, 30B decrease on progression toward the opposite sides to the respective thrust teeth 39A, 39B.

Moreover an angle of an apex face of each of the first tapered portions 100A with respect to the circular dish 30A and an angle of an apex face of each of the first tapered portions 100B with respect to the circular dish 30B is greater than an angle of an apex face of each of the second tapered portions 102A with respect to the circular dish 30A and an angle of an apex face of each of the second tapered portions 102B with respect to the circular dish 30B. Similarly, angles of both side faces of each of the first tapered portions 100A, 100B with respect to the radial directions of the circular plates 30A, 30B are greater than angles of both side faces of each of the second tapered portions 102A, 102B with respect to the radial directions of the circular plates 30A, 30B.

Thus, in the present exemplary embodiment, the moving member 64 engages with the second tapered portions 102A, 102B even more readily, and engages from the second tapered portions 102A, 102B to the first tapered portions 100A, 100B even more readily. The moving member 64 can engage smoothly with the thrust teeth 39A, 39B as a result.

In the present exemplary embodiment, each of the tapered portions 40A, 40B is configured with two gradients, these being the first tapered portion 100A or 100B and the second tapered portion 102A or 102B. However, each of the tapered portions 40A, 40B may be configured with three or more gradients.

Furthermore, the configuration of the present exemplary embodiment may be applied to the configuration of the first exemplary embodiment or to the configuration of the second exemplary embodiment.

What is claimed is:

1. A webbing take-up device comprising:
a spool configured to take up a webbing of a seatbelt device by being rotated in a take-up direction;
a tube-shaped cylinder open at an axial direction leading end side;
a fluid supply unit provided at an axial direction base end side of the cylinder and configured to supply a fluid inside the cylinder in a vehicle emergency;
a rotating member including first thrust teeth and second thrust teeth formed to respectively a first face and a second face that are rotated coaxially and oppose one another in a rotation axial direction, and including first tapered portions and second tapered portions formed to distal end portions at a rotation radial direction outside of the first thrust teeth and the second thrust teeth, respectively and having a rotation axial direction dimension that decreases on progression toward the rotation radial direction outside, the spool being rotated in the take-up direction by the rotating member rotating toward one side; and
a moving member provided inside the cylinder and configured to be moved toward the axial direction leading end side of the cylinder under pressure of the fluid, and to cause the rotating member to rotate toward the one side by being moved in an engaged state with the first and second thrust teeth of the rotating member.

2. The webbing take-up device of claim 1, wherein the rotating member includes a first circular plate and a second circular plate opposing one another coaxially in the rotation axial direction and including the first thrust teeth and the second thrust teeth formed to the mutually opposing first and second faces of the first and second circular plates, respectively.

3. The webbing take-up device of claim 2, wherein:
a first shaft portion and a second shaft portion are formed at substantially center portions of the respective first and second circular plates, the first and second shaft portions extending along the rotation axial direction from the respective first and second faces,
the first thrust teeth and the second thrust teeth extend toward the rotation radial direction outside,
one end portions of the first thrust teeth and the second thrust teeth in the rotation axial direction are thrust tooth base portions which are on the first and second respectively, and another end portions of the first trust teeth and the second thrust teeth in the rotation axial direction are thrust tooth tip portions, such that the first thrust teeth and the second thrust teeth protrude along the rotation axial direction from the thrust tooth base portions toward the thrust tooth tip portions,
the rotating member includes first radial teeth and second radial teeth formed to respectively a first outer circumferential face and a second outer circumferential face of the respective first and second shaft portions,
the first radial teeth and the second radial teeth extend along the rotation axial direction,
one end portions of the first radial teeth and the second radial teeth in the rotation radial direction are radial tooth base portions which are on the first and second outer circumferential respectively, and another end portions of the first radial teeth and the second radial teeth in the rotation radial direction are radial tooth tip portions, such that the first radial teeth and the second radial teeth protrude toward the rotation radial direction outside from the respective first and second outer circumferential faces.

4. The webbing take-up device of claim 3, wherein end portions at first circular plate side in the rotation axial direction of the first radial teeth are connected to end portions at a rotation radial direction inside of the first thrust teeth respectively, and end portions at second circular plate side in the rotation axial direction of the second radial teeth are connected to end portions at the rotation radial direction inside of the second thrust teeth respectively.

5. The webbing take-up device of claim 4, wherein the thrust tooth tip portions and the radial tooth tip portions of the first thrust teeth and the first radial teeth which are connected are connected, and the thrust tooth tip portions and the radial tooth tip portions of the second thrust teeth and the second radial teeth which are connected are connected.

6. The webbing take-up device of claim 5, wherein the first tapered portions and the second tapered portions have a rotation circumferential direction dimension that decreases on progression toward the rotation radial direction outside.

7. The webbing take-up device of claim 5, wherein the radial tooth tip portions of the first radial teeth and the second radial teeth are curved with a smaller radius of curvature than a radial dimension of an outer peripheral profile of the moving member.

8. The webbing take-up device of claim 7, wherein parts of the thrust tooth tip portions of the first thrust teeth and the second thrust teeth, which parts are disposed further toward the rotation radial direction inside than length direction intermediate portions of the first thrust teeth and the second thrust teeth respectively are curved with a smaller radius of curvature than the radial dimension of the outer peripheral profile of the moving member.

9. The webbing take-up device of claim 3, wherein:
in a rotation circumferential direction, one of the first thrust teeth is formed to the first face between the first radial teeth which are adjacent in the rotation circumferential direction, and one of the second thrust teeth is formed to the second face between the second radial teeth which are adjacent in the rotation circumferential direction, and an end at a rotation radial direction inside of the one of the first thrust teeth is separated from the first outer circumferential face, and an end at the rotation radial direction inside of the one of the second thrust teeth is separated from the second outer circumferential face.

10. The webbing take-up device of claim 2, wherein:
the first tapered portions and the second tapered portions each includes a first tapered part and a second tapered part,
the first tapered part is formed at the rotation radial direction inside portion of each of the first tapered portions and the second tapered portions, and the second tapered part is formed at the rotation radial direction outside portion of each of the first tapered portions and the second tapered portions,
the first tapered part and the second tapered part are connected, and
an angle of an apex face of the first tapered part with respect to the first face and an angle of an apex face of the first tapered part with respect to the second face are greater than an angle of an apex face of the second tapered part with respect to the first face and an angle of an apex face of the second tapered part with respect to the second face.

11. The webbing take-up device of claim 1, wherein the moving member is formed of a synthetic resin material and is capable of deforming on being subjected to an external force.

12. The webbing take-up device of claim 1, wherein the first tapered portions and the second tapered portions have a rotation circumferential direction dimension that decreases on progression toward the rotation radial direction outside.

* * * * *